United States Patent
Nguyen et al.

(10) Patent No.: US 10,774,970 B2
(45) Date of Patent: Sep. 15, 2020

(54) SHAFT MECHANICAL LOCK FOR PIPELINE ISOLATION TOOLS

(71) Applicant: TDW Delaware, Inc., Wilmington, DE (US)

(72) Inventors: Khanh Van Nguyen, Stavanger (NO); Hallgeir Foss Alsvik, Stavanger (NO)

(73) Assignee: TDW Delaware, Inc., Wilmington, DE (US)

( * ) Notice: Subject to any disclaimer, the term of this patent is extended or adjusted under 35 U.S.C. 154(b) by 50 days.

(21) Appl. No.: 16/163,245

(22) Filed: Oct. 17, 2018

(65) Prior Publication Data

US 2020/0124222 A1    Apr. 23, 2020

(51) Int. Cl.
   *F16L 55/11* (2006.01)

(52) U.S. Cl.
   CPC ..................... *F16L 55/11* (2013.01)

(58) Field of Classification Search
   CPC ....................................... F16L 55/11
   USPC ........................................... 138/89
   See application file for complete search history.

(56) References Cited

U.S. PATENT DOCUMENTS

| | | | |
|---|---|---|---|
| 3,107,696 A | 10/1963 | Ver Nooy | |
| 3,575,087 A * | 4/1971 | Sherwood | F15B 15/262 92/23 |
| 3,746,093 A | 7/1973 | Mullins | |
| 3,856,081 A | 12/1974 | Canilizo et al. | |
| 4,723,578 A * | 2/1988 | Mordarski | F16L 55/13 138/89 |
| 4,848,734 A * | 7/1989 | Ford | H02G 1/08 254/134.4 |
| 4,899,780 A * | 2/1990 | Astrom | B67B 7/42 137/319 |
| 5,194,214 A * | 3/1993 | Snyder | F28F 11/02 376/203 |

(Continued)

FOREIGN PATENT DOCUMENTS

| | | |
|---|---|---|
| GB | 2474887 A | 5/2011 |
| NO | 20090008 A | 4/2009 |

(Continued)

OTHER PUBLICATIONS

Bauer Hydraulic, "hydraulic locking cylinder with mechanical lock", , Publisher: http://www.bauer.no/pdf/bro-lock1.pdf.

(Continued)

*Primary Examiner* — Craig M Schneider
*Assistant Examiner* — David R Deal
(74) *Attorney, Agent, or Firm* — Gable & Gotwals (57) ABSTRACT

A mechanical lock unit with a shaft lock assembly and method of achieving a self-lock mode for, e.g., hydraulically activated isolation plug module. The shaft lock assembly includes a teeth-form ring that surrounds a shaft. The teeth-form ring defines a plurality of teeth. A teeth-form split gripper assembly is positioned to surround the teeth-form ring. The teeth-form split gripper assembly has at least a first teeth-form split gripper and a second teeth-form split gripper with a spring therebetween for biasing the first teeth-form split gripper away from said second teeth-form split gripper. The first teeth-form split gripper and the second teeth form split gripper having an inner surface that defines a plurality of teeth for cooperative engagement with the plurality of teeth of the teeth-form ring.

20 Claims, 8 Drawing Sheets

(56) References Cited

U.S. PATENT DOCUMENTS

| | | | | |
|---|---|---|---|---|
| 5,402,828 A * | 4/1995 | Pino | .................... | F16L 55/134 |
| | | | | 138/89 |
| 5,778,733 A | 7/1998 | Stringer | | |
| 5,797,431 A * | 8/1998 | Adams | .................. | F16L 55/136 |
| | | | | 138/89 |
| 6,161,657 A | 12/2000 | Zhuang et al. | | |
| 6,241,424 B1 * | 6/2001 | Bath | ......................... | F16L 1/26 |
| | | | | 15/104.061 |
| 6,629,563 B2 | 10/2003 | Doane | | |
| 7,866,346 B1 * | 1/2011 | Walters | ................... | E21B 21/01 |
| | | | | 138/89 |
| 8,171,960 B2 * | 5/2012 | Syse | .................... | F16L 55/136 |
| | | | | 138/89 |
| 8,256,270 B2 * | 9/2012 | Fielding | ................ | F16L 55/132 |
| | | | | 73/49.1 |
| 8,579,023 B1 | 11/2013 | Nish et al. | | |
| 9,163,650 B2 | 10/2015 | Crowder | | |
| 9,823,155 B2 * | 11/2017 | Sarkissian | ............. | G01M 3/022 |
| 10,215,322 B1 * | 2/2019 | James | ...................... | F16K 1/00 |
| 2015/0063919 A1 | 3/2015 | Greening et al. | | |

FOREIGN PATENT DOCUMENTS

| | | | |
|---|---|---|---|
| WO | 2014077800 A1 | 5/2014 | |
| WO | 2017218331 A1 | 12/2017 | |

OTHER PUBLICATIONS hanchen-hydraulic.com, "Hydraulic clamping device ratio-clamp hydraulic cylinder rod lock", , Publisher: www.haenchen-hydraulic.com/clamping-device.html.

* cited by examiner

SHAFT MECHANICAL LOCK FOR PIPELINE ISOLATION TOOLS

FIELD OF THE INVENTION

The technical field of the invention is the mechanical field, specifically hydraulics. More particularly, the invention relates to a lock for a hydraulically activated isolation plug module, when the latter is used to isolate pipelines.

BACKGROUND OF THE INVENTION

A pipeline isolation module is provided for isolating pressurized pipelines so that equipment maintenance, repairs, and replacements can be done without bleeding down an entire system. Typical uses for a pipeline isolation module include valve replacement, riser and midrise repair, tie-ins, dropped objection protection during construction, hydrotesting, and trap installation. The plug is used to isolate the pressure inside the pipeline by setting a sealing rubber packer against a hydraulic cylinder. A typical isolation plug is locked by hydraulic actuation.

The pipeline isolation tool or plug is used to isolate pressure inside a pipeline by setting a sealing rubber packer against a hydraulic cylinder. Typically, the isolation plug is locked by hydraulic actuation.

Pipeline isolation tools typically utilize hydraulic force to set the tool. Setting the tool securely is important to eliminate any rotation or axial movement of the shaft that can damage the shaft surface.

SUMMARY OF THE INVENTION

The pipeline isolation tool of the invention utilizes a shaft mechanical lock to mechanically lock the shaft of an isolation plug module from axial movement by using teeth engagement between a teeth-form ring on the shaft and teeth-form split grippers in the mechanical lock unit.

The device of the invention can be used to mechanically lock the position of the shaft by the engagement of two teeth-form parts, i.e., the teeth-form split grippers in the mechanical lock unit and the teeth-form ring on the shaft. The spring-loaded lock piston functions to maintain teeth engagement, which prevents the shaft from moving in an axial direction. The teeth engagement differs from thread engagement, i.e., teeth engagement in the tool of the invention utilizes parallel teeth so that the shaft can still rotate without becoming disengaged. The tool of the invention can be used to mechanically lock a hydraulically activated isolation plug module for isolating pipelines. Mechanically locking the pipeline isolation tool acts as a safeguard when the hydraulic lock is lost, e.g., when there is a leak in the hydraulic system.

Engagement of the teeth-form split grippers together with the horizontal hold of the spring-loaded lock piston increases the ability to hold the shaft at very high loads.

The tool of the invention, therefore, increases reliability of the lock and, therefore, increases reliability of the seal, and also reduces the risk of losing the lock, thereby reducing the overall risk of operational failure.

The shaft mechanical lock may be used with isolation plugs having an existing hydraulic system and offers the possibility to isolate from a high "back pressure".

The tool of the invention can be used to mechanically lock the axial movement of all types of shafts that have a high working load with high lock reliability. The mechanical lock provides an additional safeguard for the hydraulic lock in addition to hydraulic actuation of a sealing packer.

One advantage is that the teeth engagement as well as the horizontal lock from the spring-loaded lock piston allow the dimensions of the design to be small while maintaining a high work load capacity.

In contrast to thread engagement, the parallel teeth engagement of the tool of the invention allows full rotation without losing engagement.

The tool of the invention includes teeth form split grippers, a teeth form ring on the shoulder and a spring loaded lock piston in the mechanical lock unit. Teeth-form split grippers are lifted up by the springs between them. Teeth of the teeth-form split grippers are positioned to engage teeth on a teeth-form ring on the shaft.

The teeth-form ring on the shaft may utilize a clearance fit with the shaft. The teeth-form ring on the shaft prevents damage to the shaft during the lock/unlock process. A spring or elastomeric member at the end of the teeth-form ring may be provided to ensure that the teeth-form ring can move slightly to the left or to the right to facilitate correct engagement with the teeth-form split grippers. In one embodiment, the teeth-form ring can be mounted in one step on the shaft and can be held by a retaining ring or a lock nut at one end.

The teeth-form split grippers are assembled with a housing, lock piston, and lid as one unit (called the mechanical lock unit). The teeth-form ring is assembled to the shaft, e.g., with a clearance fit, and held by a retaining ring or lock nut. The mechanical lock unit is then mounted at the locked position of the shaft.

In use, the isolation plug is pigged through a pipeline to an isolation set location. The mechanical lock unit is put into and unlock state. Hydraulic pressure is applied to the plug cylinder to move a plug piston and set a rubber packer. After the packer is fully set, hydraulic force inside the mechanical lock unit is released so that a spring force pushes the lock piston of the mechanical lock unit into a locked state. The teeth engagement holds the isolation plug in place together with the hydraulic force inside the isolation plug.

In the normal locked state, the spring-loaded lock piston in the mechanical lock unit compresses the teeth-form split gripper assembly and the springs between teeth-form split grippers. Compression of the teeth-form split gripper assembly causes the teeth-form split grippers to engage with the teeth-form ring that holds and locks the axial movement of the shaft. The parallel, circumferential orientation of the teeth, rather than a threaded orientation, allows the shaft to rotate without losing the engagement. Horizontal contact between a lock piston and the split grippers, as well as teeth engagement, result in transferring all of the load of the plug piston to the strong lid of the mechanical lock unit. Therefore, even though the dimensions of the tool of the invention may be small, the tool of the invention can hold a very heavy load.

To unlock the mechanical lock unit, a hydraulic force is applied to the spring-loaded lock piston to overcome its spring force for pushing the piston into an unlocked position. When there is no applied force from the lock piston, the teeth-form split grippers are lifted up by the springs between the teeth form split grippers. Teeth engagement between the split grippers of the teeth form split gripper assembly and the teeth form ring of the shaft is, therefore, removed and the shaft is unlocked and is free to move.

DETAILED DESCRIPTION OF THE PREFERRED EMBODIMENTS

Mechanical lock unit 10 includes shaft lock assembly 12. Shaft lock assembly 12 includes shaft 14. In one embodiment, shaft 14 defines first diameter portion 16, second diameter portion 18 and first annular surface 20. First annular surface 20 is located between first diameter portion 16 and second diameter portion 18.

First resilient ring 22 surrounds second diameter portion 18 of shaft 14. First resilient ring 22 has first side 24 that is adjacent to first annular surface 20 of shaft 14.

Figure 2:
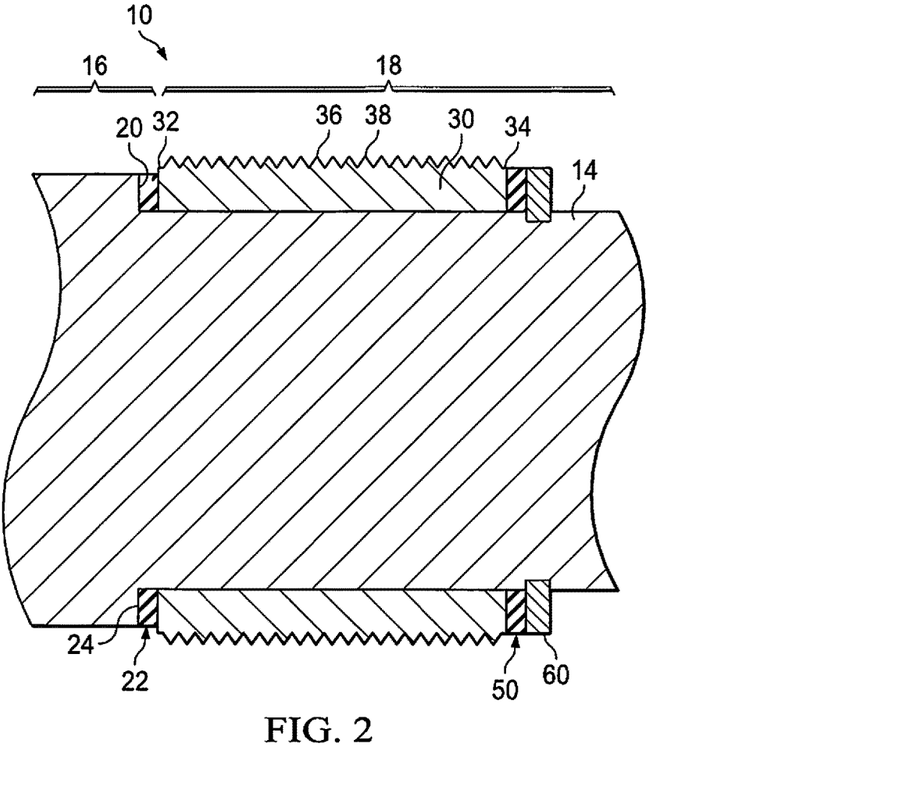
FIG. 2 shows a first embodiment wherein the teeth-form ring is received on an end of a shaft.

Teeth form ring 30 surrounds second diameter portion 18 of shaft 14. Teeth form ring 30 has first end 32, second end 34, and outer surface 36 (FIG. 2). Outer surface 36 defines plurality of teeth 38. First end 32 is positioned adjacent to first resilient ring 22.

Still referring to FIG. 2, second resilient ring 50 surrounds second diameter portion 18 of shaft 14. Second resilient ring 50 is adjacent to second end 34 of teeth form ring 30.

Retain ring or lock ring 60 surrounds second diameter portion 18 of shaft 14. Retain ring 60 is positioned adjacent to second resilient ring 50.

Figure 3:
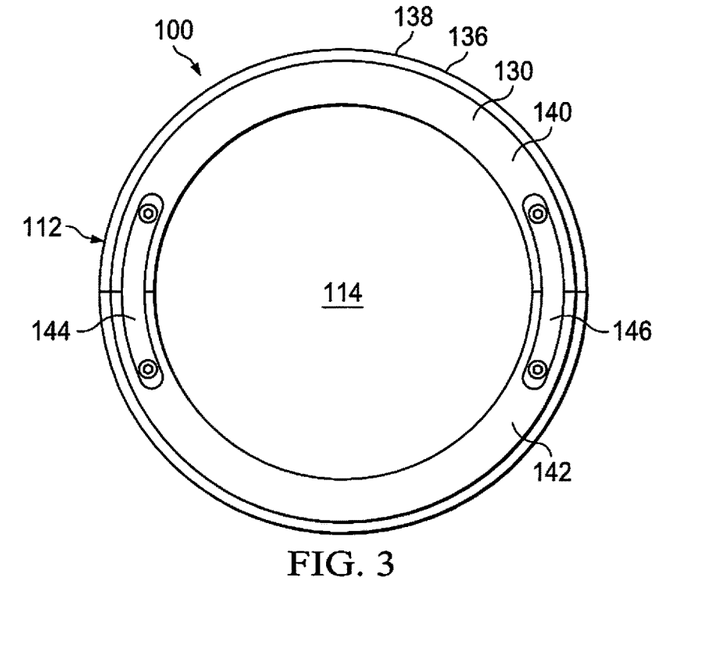
FIG. 3 shows an end view of a second embodiment or bifurcated teeth form ring.
Figure 4:
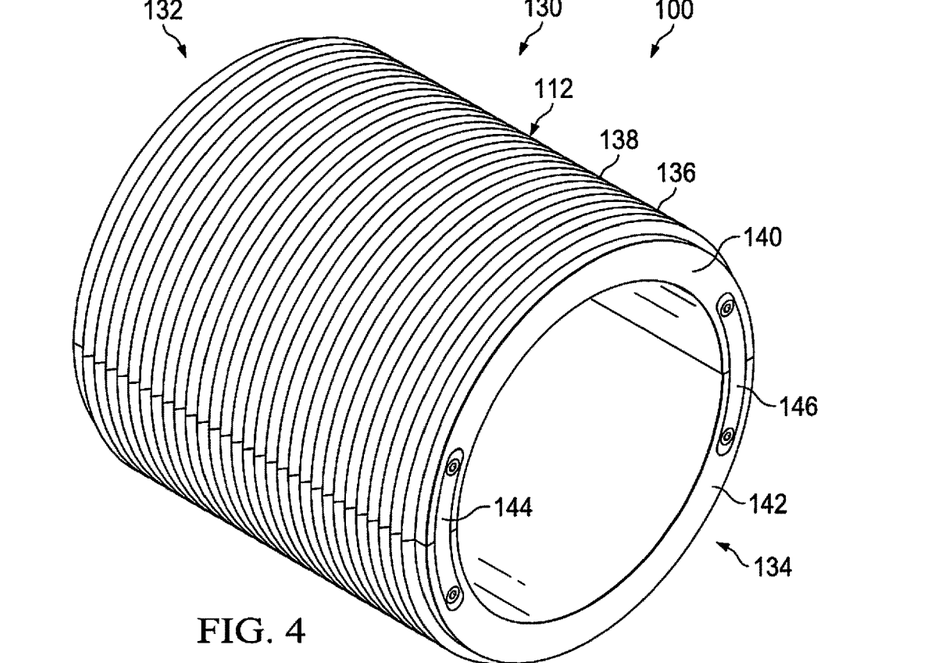
FIG. 4 shows a side view of the bifurcated teeth form ring of FIG. 3.
Figure 10:
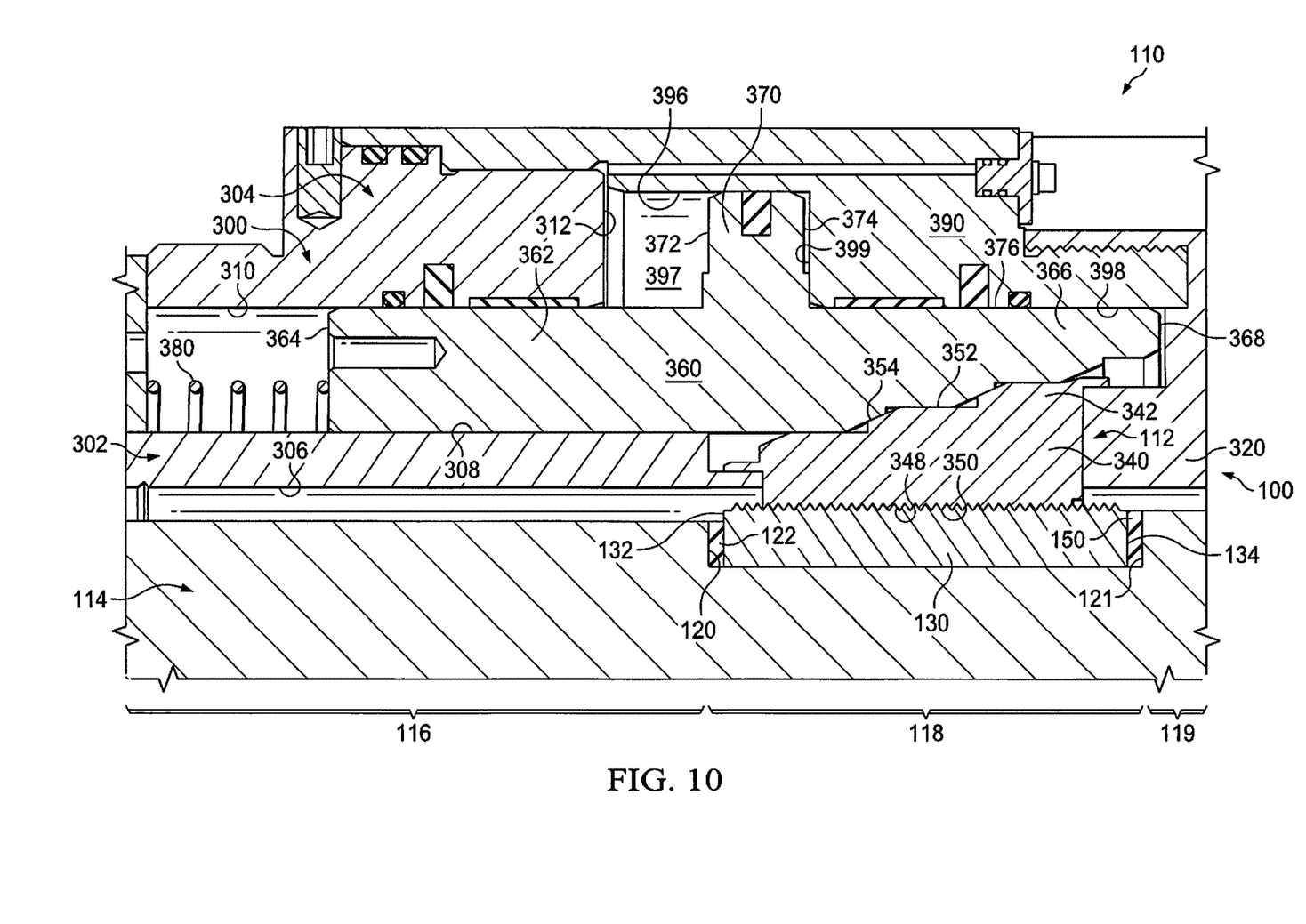
FIG. 10 shows an enlarged section of the plug module of FIG. 9 wherein the second embodiment or bifurcated teeth-form ring of FIGS. 3 and 4 received in a recessed area of a shaft as part of a mechanical lock unit shown in a set state.

A second embodiment, i.e., mechanical lock unit 100, includes shaft lock assembly 112 (FIGS. 3, 4). Shaft lock assembly 112 includes shaft 114. Shaft 114 defines first diameter portion 116, second diameter portion 118, and third diameter portion 119 (FIG. 10). First diameter portion 116 and third diameter portion 119 may be the same diameter. Shaft 114 additionally defines first annular surface 120 between first diameter portion 116 and second diameter portion 118. Shaft 114 additionally defines second annular surface 121 between second diameter portion 118 and third diameter portion 119.

First resilient ring 122 surrounds second diameter portion 118 of shaft 114. First resilient ring 122 has a first side adjacent to first annular surface 120 of shaft 114.

A second embodiment of the teeth form ring is teeth form ring 130 (FIGS. 3 and 4). Teeth form ring 130 surrounds second diameter portion 118 of shaft 114. Teeth form ring 130 has first end 132 and second end 134. Teeth form ring 130 additionally has outer surface 136. Outer surface 136 defines a plurality of teeth 138. Teeth form ring 138 is made up of first half 140 and second half 142. First end 132 is located adjacent to first resilient ring 122. Teeth form ring 130 additionally includes first connector 144 for connecting first half 140 and second half 142. Teeth form ring 130 also includes second connector 146 for connecting first half 140 and second half 142.

Second resilient ring 150 surrounds second diameter portion 118 of shaft 114. Second resilient ring 150 is positioned adjacent to second end 134 of teeth form ring 130 and also adjacent to second annular surface 121 of shaft 114.

Figure 5:
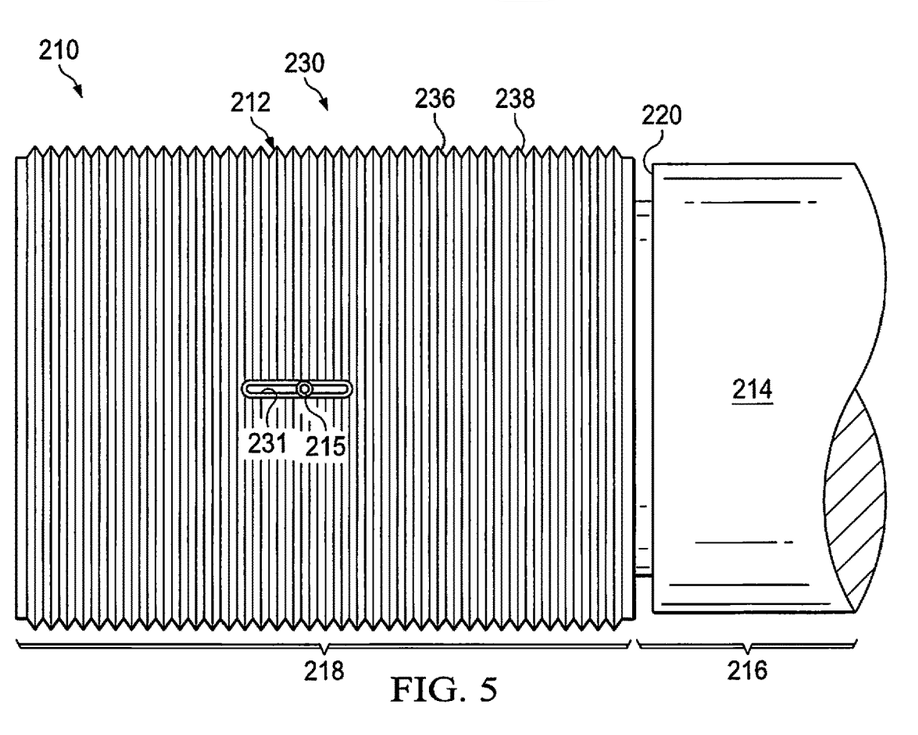
FIG. 5 shows an elevation view of a third embodiment or slotted teeth form ring.

A third embodiment of mechanical lock unit 210 includes shaft lock assembly designated 212 (FIG. 5). Shaft lock assembly 212 includes slotted teeth form ring 230. Shaft lock assembly 212 includes shaft 214. Shaft 214 includes bolt 215 that extends radially from shaft 214. Shaft 214 defines a first diameter portion 216 and a second diameter portion 218. Shaft 214 defines a first annular surface 220 between first diameter portion 216 and second diameter portion 218.

Slotted teeth form ring 230 defines slot 231 for receiving bolt 215. Slotted teeth form ring 230 may be constructed of two halves, similar to teeth form ring 130, above. Bolt 215 is provided for securing teeth form ring 230 on shaft 214, and for allowing axial travel of slotted teeth form ring 230 on shaft 214 to facilitate teeth engagement. Slotted teeth form ring 230 has outer section 236 that defines a plurality of teeth 238. Resilient rings, e.g., 22, 50 and 150 also facilitate axial movement of teeth from ring 30, 130, 230 to ensure full engagement of teeth 38, 138 or 238 and teeth 350 of teeth from split gripper assembly 340. In one embodiment, bolt 215 is threadably received in a threaded hole on shaft 214.

Figure 9:
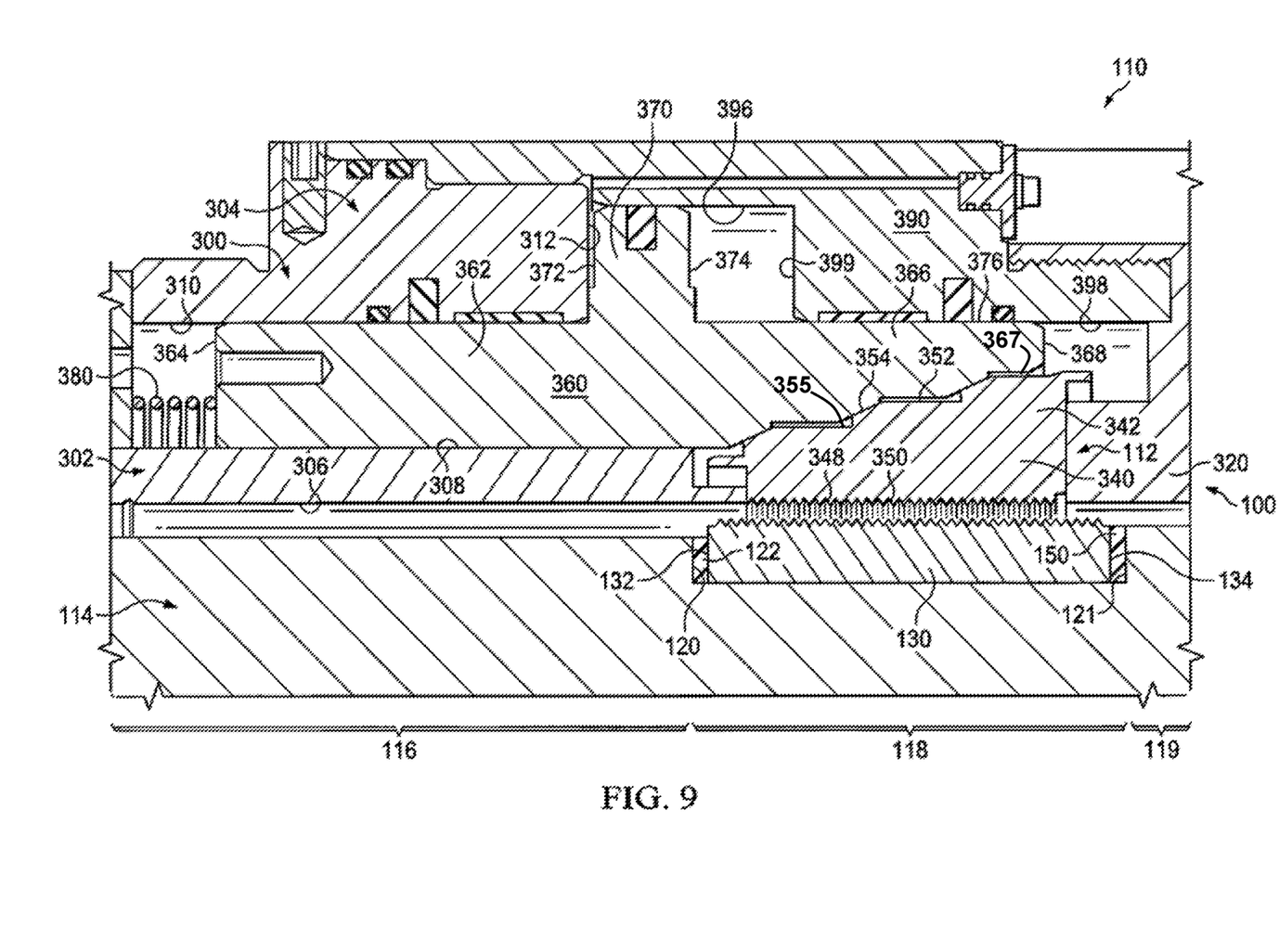
FIG. 9 shows an enlarged section of the plug module of FIG. 7 wherein the second embodiment or bifurcated teeth-form ring of FIGS. 3 and 4 received in a recessed area of a shaft as part of a mechanical lock unit shown in an unset state.

Referring now to FIGS. 9 and 10, mechanical lock unit 10 may include rear lid 300. Rear lid 300 defines inner portion 302 and outer portion 304. Inner portion 302 defines inside surface 306 and outer surface 308. Inside surface 306 surrounds first diameter portion 116 of shaft 114 that is adjacent to first annular surface 120 of shaft 114. Outer portion 304 of rear lid 300 defines an inner surface 310 and a first surface 312. Although mechanical lock unit 10 is shown with second embodiment components, e.g., shaft 114 and shaft lock assembly 112, it should be understood that similar construction may be obtained by using first embodiment components or third embodiment components that function in a similar way.

Front lid 320 at least partially surrounds third diameter portion 119 of shaft 114 and is adjacent to teeth form split gripper assembly 340.

Figure 1A:
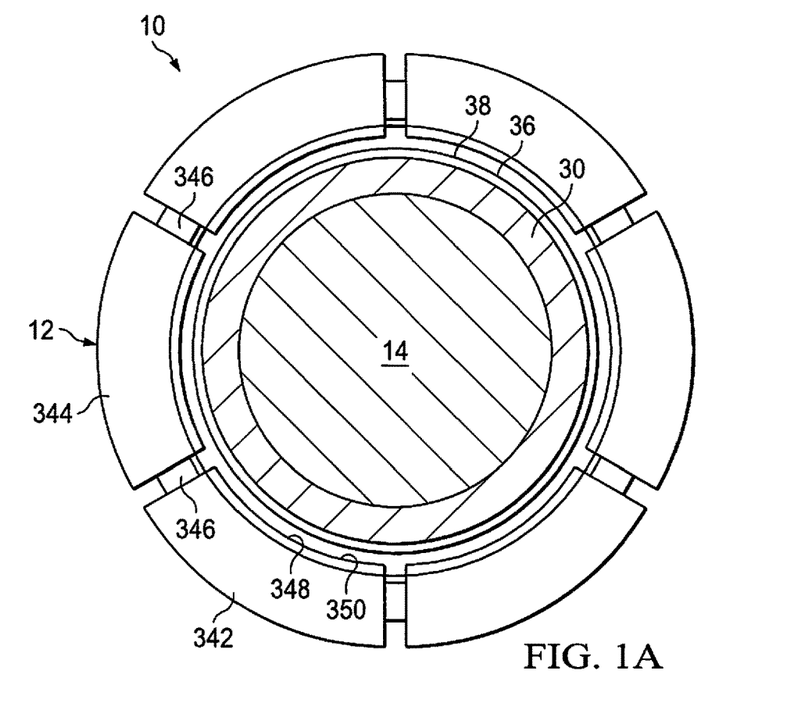
FIG. 1A shows a cross-sectional view of a shaft surrounded by the teeth-form split grippers of the invention in an unlocked state.
Figure 1B:
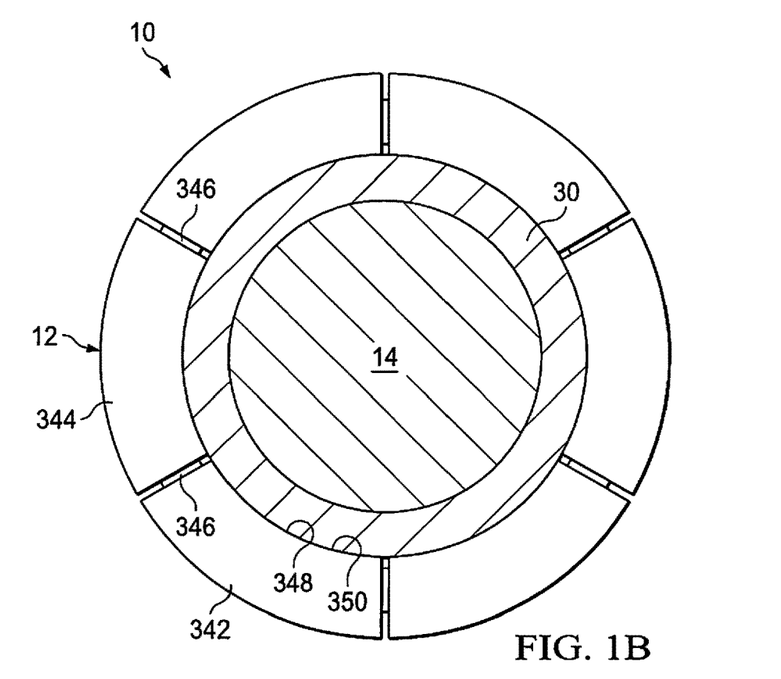
FIG. 1B shows a cross-sectional view of a shaft surrounded by the teeth-form split grippers of FIG. 1A in a locked state.

Teeth form split gripper assembly 340 is retained between rear lid 300 and front lid 320. Teeth form split gripper assembly 340 is located to surround teeth form ring 130. Teeth form split gripper assembly 340 has at least a first teeth form split gripper 342 (FIGS. 1A, 1B, 9, and 10) and a second teeth form split gripper 344 (FIGS. 1A, 1B). Spring 346 (FIGS. 1A, 1B) is located between at least first teeth form split gripper 342 and second teeth form split gripper 344 for biasing first teeth form split gripper 342 away from second teeth form split gripper 344. Springs 346 may be located between all teeth from split grippers in teeth from split gripper assembly 340.

First teeth form split gripper 342 and second teeth form split gripper 344 define inner surface 348. Inner surface 348 defines a plurality of teeth 350. Teeth 350 are provided for cooperative engagement with plurality of teeth 38, 138, and 238 of teeth form ring 30, 130, or 230. Teeth form split gripper assembly 340 additionally defines an outer surface 352 that defines at least one ramp 354. A flat run 355 may be adjacent to the ramp 354.

A spring loaded lock piston 360 includes a first sliding portion 362 that defines a first end 364 and second ramp portion 366. Second ramp portion 366 defines second end 368. The second end may include a second flat run 367 adjacent to the second ramp portion 366. Flange portion 370 extends outwardly. Flange portion 370 defines a first surface 372 and a second surface 374. First sliding portion 362 surrounds and is in sliding engagement with outer surface 308 of inner portion 302 of rear lid 300 and is also for sliding engagement with inner surface 310 of outer portion 304 of rear lid 300. Second ramped portion 366 defines an inside surface for selective engagement with the at least one ramp 354 on outer surface 352 of teeth form split gripper assembly 340. Second flat run 367 and flat run 355 define another portion of the inside and outer surfaces respectively.

Biasing member 380 is provided adjacent to first end 364 of lock piston 360 for biasing lock piston 360 towards engagement with teeth form split gripper assembly 340.

Housing 390 defines a first portion that defines flange engaging surface 396. Housing 390 defines a second portion that defines inside surface 398 for engaging outside surface 376 of second ramped portion 366 of spring loaded lock piston 360. Housing 390 defines a second surface 399.

Wherein first surface 372 of flange portion 370 of lock piston 360, flange engaging surface 396, and second surface 399 of housing 390 define flange receiving area 397 for receiving flange portion 370 of lock piston 360.

A hydraulic force may be applied to the volume between second surface 374 of flange portion 370 and second surface 399 at housing 390 for forcing lock piston 360 away from engagement with teeth form split gripper assembly 340 thereby disengaging teeth form split gripper 342 from contact with teeth form ring 38, 138, or 238 and establishing an unlocked configuration for mechanical lock unit 10.

A hydraulic force may be applied to the volume between first surface 372 of flange portion 370 and first surface 312 of rear lid 300 as a safeguard for forcing lock piston 360 into engagement with teeth form split gripper assembly 340, thereby engaging teeth form split gripper 342 into contact with teeth form ring 38, 138, or 238 and establishing a locked configuration for mechanical lock unit 10, 110 or 210.

Figure 6:
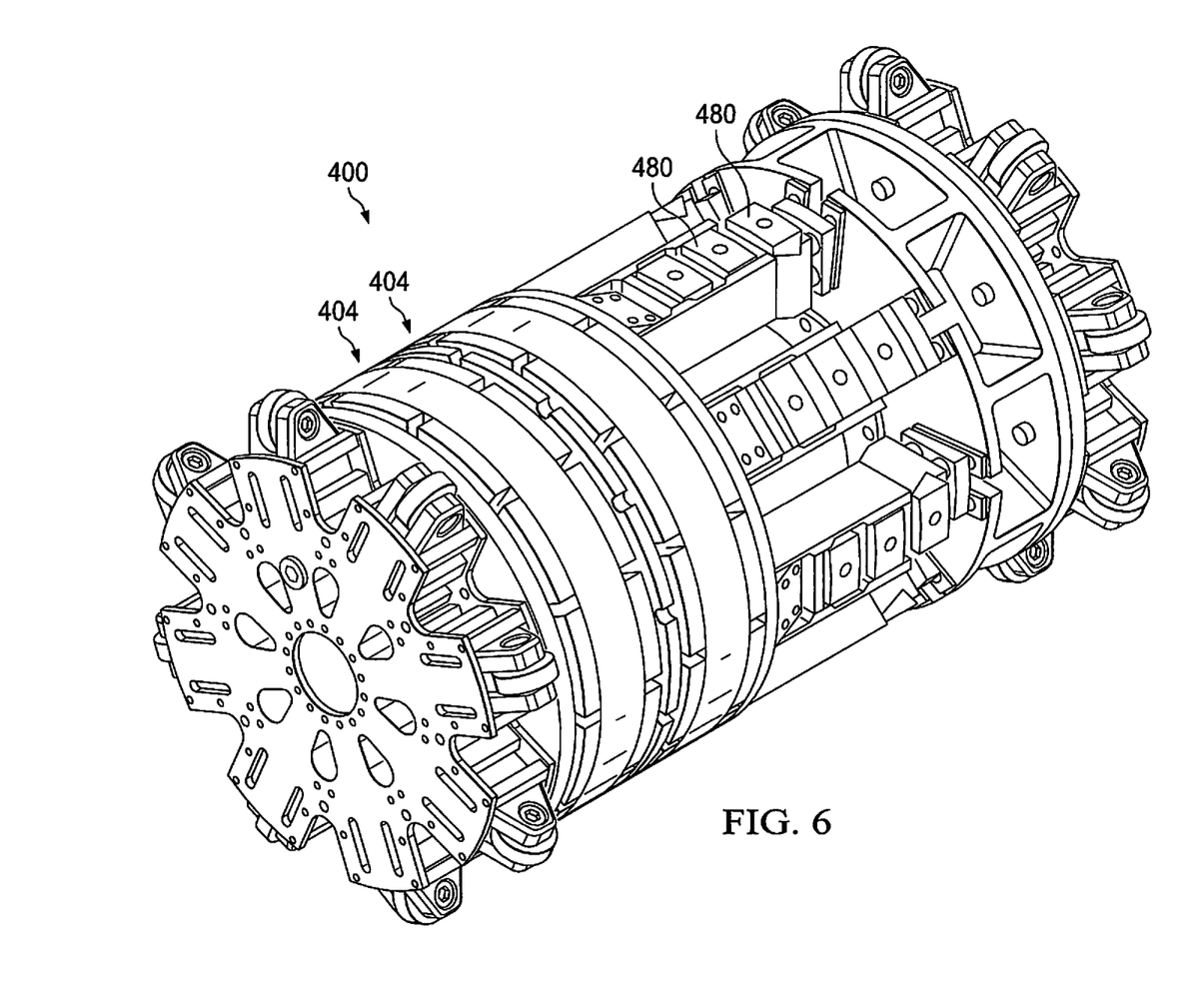
FIG. 6 is a perspective view of an inline isolation plug module.
Figure 7:
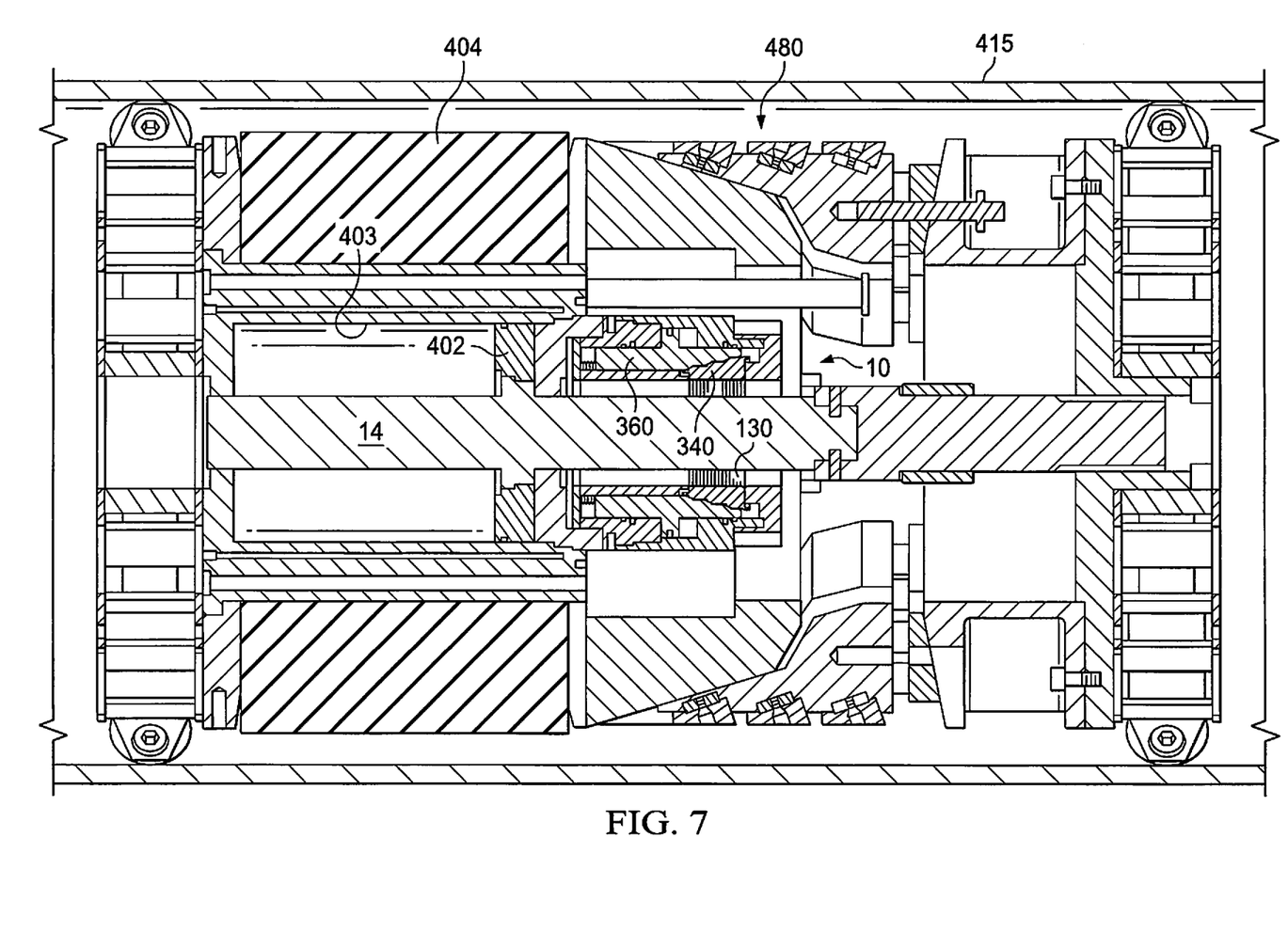
FIG. 7 is a cross-sectional view of the plug module of FIG. 6 shown in an unset state.
Figure 8:
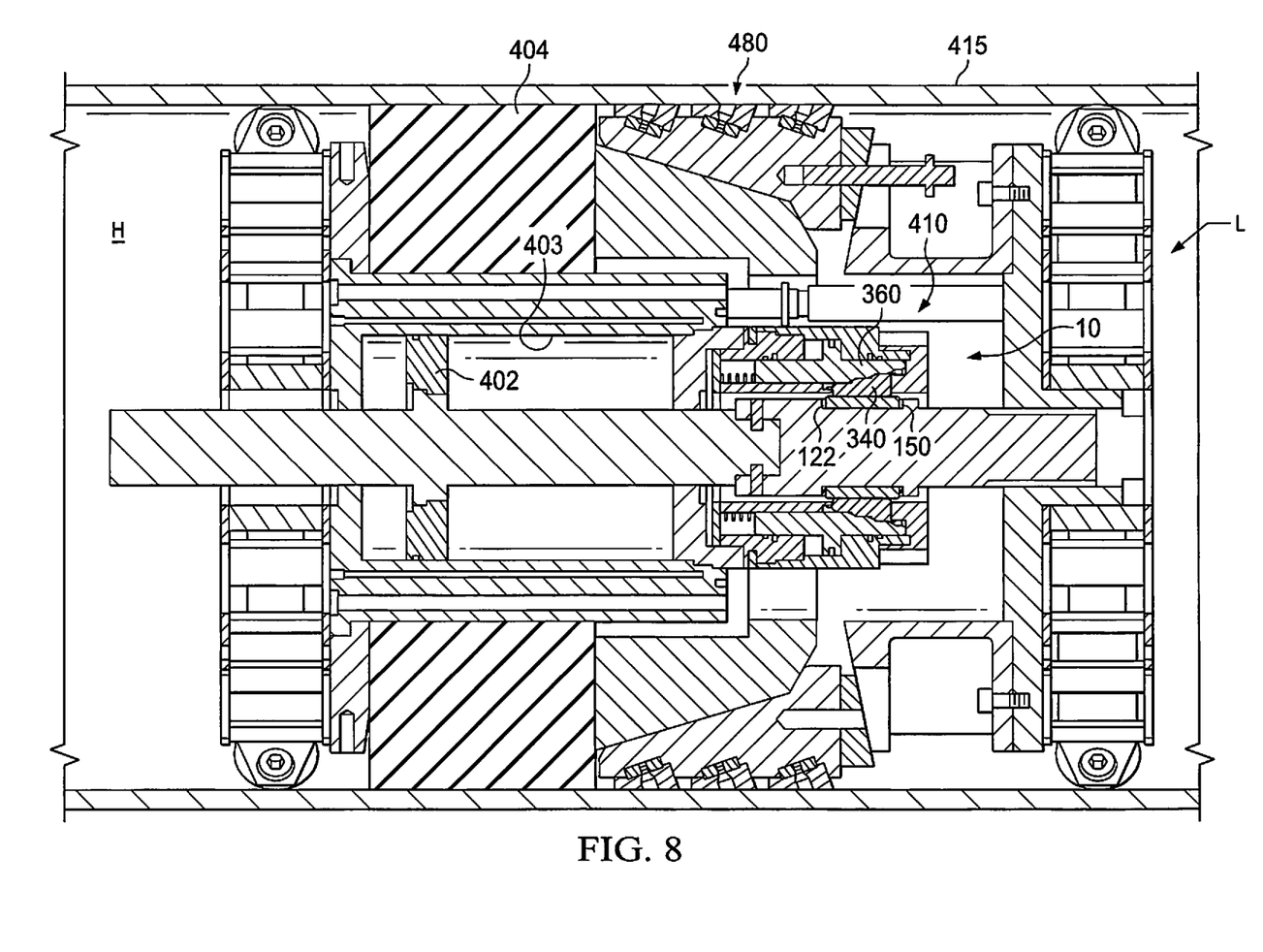
FIG. 8 is a cross-sectional view of the plug module of FIG. 6 shown in a set state wherein a piston is locked by the mechanical lock.

In use, isolation plug 400 (FIGS. 6-8) is pigged through a pipeline to an isolation set location. Mechanical lock unit 10, 100, 210 or 410 is put into an unlocked state. Hydraulic pressure is applied to move plug cylinder 402 (FIG. 8) and attached shaft 14, 114, 414 for setting rubber packer 404 (FIGS. 6-8). After packer 404 is fully set, the hydraulic force inside mechanical lock unit 10, 100, 210, 410 is released so that a spring force of biasing member 380 pushes lock piston 360 of mechanical lock unit 410 into a locked state. The engagement of teeth 38 of teeth form ring 30, 130, or 230 and teeth 350 of teeth form split gripper assembly 340, 440 holds the plug piston in place together with the hydraulic force inside isolation plug 400.

In the normal locked state, the spring-loaded lock piston 360 in mechanical lock unit 10, 110, 210, 410 compresses springs 346 between teeth-form split grippers, e.g., between 342 and 344. Compression of the teeth-form split grippers causes teeth-form split grippers, e.g., between 342 and 344, to engage with teeth-form ring 30, 130, or 230 that holds and locks axial movement of shaft 14, 114, 414. In one embodiment, parallel, circumferential orientation of teeth 38, 138, or 238 and 350, rather than a threaded orientation, allows shaft 14 to rotate without losing engagement. Horizontal contact at outer surface 352 between lock piston 360 and teeth form split grippers, e.g., 342 and 344, as well as teeth engagement between teeth 38, 138, or 238 and 350, result in transferring all of the load of plug piston 402 held by rear lid 300 and front lid 320 of mechanical lock unit 10, 100, 210, 410, which are very strong.

To unlock mechanical lock unit 10, 100, 210, 410, a hydraulic force is applied to spring-loaded lock piston 360 to overcome the force of biasing member 380 for pushing lock piston 360 into an unlocked position. When there is no applied force from lock piston 360, teeth-form split grippers, e.g., 342 and 344, of teeth form split gripper assembly 340 are lifted up by springs 346 between teeth form split grippers, e.g., 342 and 344. Teeth engagement between split grippers 342, 344 of teeth form split gripper assembly 340 and teeth form ring 30, 130, or 230 on shaft 14 is, therefore, removed and shaft 14 is unlocked and is free to move.

When mechanical lock 10, 100, 210, 410 is used in pipeline isolation tools, packers 404 form a seal with a pipeline wall 415 (FIGS. 7, 8), which results in a pressure disparity across the seal, i.e., the seal of packers 404 creates a high pressure side H and a low pressure side L (FIG. 8). The higher pressure on high pressure side H results in forces that act on the isolation tool that push on the isolation tool from high pressure side H towards low pressure side L. Mechanical lock 10, 100, 210, 410 locks only in one direction, i.e., mechanical lock 10, 100, 210, 410 locks the unset direction where the piston, comprised of shaft 14 and piston head 402 moves toward the low pressure side L and the plug cylinder 403 moves toward the high pressure side H, which prevents unset of packer 404. A compression spring, e.g., resilient ring 50 (FIG. 2) or another spring member, is located adjacent to second end 34, 134 of teeth-form ring 30, 130, 230. When mechanical lock 10, 100, 210, 410 is in a locked position (shown in FIG. 8) and there is high isolation pressure in the pipeline on the high pressure side H that creates a large pressure differential across packers 404, Compression spring 50 will be compressed to allow packers 404 to squeeze more (this is self-lock mode of the isolation tool). The self-lock mode increases the sealing capacity of the isolation tool under high isolation pressure. Thus, mechanical lock 10, 100, 210, 410 in pipeline isolation locks shaft 14 in one direction, and does not lock shaft 14 in the other direction to let packers 404 squeeze more in self-lock mode when there is an isolation pressure in the pipeline.

In greater detail, when isolation plug 400 is set, shaft lock assembly 112, 212 is locked, i.e., slips system 480 (FIG. 7) will grip the pipe and hold isolation plug 400 in place. Therefore, when set, structure connected to slip system 480, e.g., shaft 14, 114, 214, and plug piston, comprised of shaft 14 and piston head 402, is held in place. Pressure from high pressure side H will push remaining components, including teeth form ring 30, 130, 230 and teeth form split gripper assembly 340, towards low pressure side L, which forces packers 404 outwardly, i.e., increases the squeeze packers 404. Mechanical lock is achieved by mechanical lock unit 10, 100, 210, 410, which holds teeth form ring 30, 130, 230, when compression spring 50 is compressed. Compression of compression spring 50 results in an increase in the volume acting on the piston cylinder 403, i.e., ($V_{set}$), which lowers the set pressure. This is referred to as self-lock mode.

The amount of movement, i.e., the increase in squeeze of packer 404, in self-lock mode depends on a difference between the force from isolation pressure and the original hydraulic set force, i.e., the pre-squeeze of the packer. Self-lock mode may be observed by a drop in the set pressure. At self-lock mode there will be a gap between first end 32, 132 of teeth form ring 30, 130, 230, 430 and first annular surface 20, 120, 220 of shaft 14, 114, 214 while second end 34, 134 of teeth form ring 30, 130, 230 compresses compression spring 50. In the embodiment shown in FIGS. 8 and 9, movement of the teeth form ring 30, 130, 230 leads to a drop of set pressure in self-lock mode. When the isolation pressure is removed, e.g., after an operation is complete, the set volume, $V_{set}$, will be restored to normal, which leads to restoration or increase in the set pressure. In self-lock mode, if set pressure is lost, e.g., due to a leak inside the hydraulic system or due to losing oil inside the set volume, $V_{set}$, the hydraulic lock will be lost. However, the isolation plug 400 will continue to seal since packer 404 will continue to be squeezed by isolation pressure. Therefore, self-lock mode increases the safety level of isolation plug 400 in operation. Additionally mechanical lock will remain as a safe guard to self-lock mode since mechanical lock is achieved by teeth engagement.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A mechanical lock unit of a pipeline isolation tool comprising:
    a teeth-form ring for surrounding a shaft, said teeth-form ring having a first end, a second end, a longitudinal axis, and an outer surface, said outer surface defining a plurality of teeth thereon;
    a teeth-form split gripper assembly surrounding said teeth-form ring, said teeth-form split gripper assembly having at least a first teeth-form split gripper, a second teeth-form split gripper, and a spring between said first teeth-form split gripper and said second teeth-form split gripper for biasing said first teeth-form split gripper away from said second teeth-form split gripper, said first teeth-form split gripper and said second teeth form split gripper defining an inner surface, said inner surface defining a plurality of teeth for cooperative engagement with said plurality of teeth of said teeth-form ring.

2. The mechanical lock unit according to claim 1 wherein: said teeth-form ring has a first part and a second part for facilitating installation on a shaft.

3. The mechanical lock unit according to claim 2 further comprising:
    a connector for joining said first part and said second part of said teeth-form ring.

4. The mechanical lock unit according to claim 1 wherein: said teeth-form ring defines a slot for receiving a bolt for slidably retaining said teeth-form ring on a shaft.

5. The mechanical lock unit according to claim 4 wherein said bolt is threadably received in a threaded hole in said shaft.

6. The mechanical lock unit according to claim 1 wherein said plurality of teeth on said teeth form ring and said plurality of teeth on said teeth form split gripper assembly are parallel for allowing full rotation of said teeth-form split gripper assembly with respect to said teeth-form ring without losing engagement.

7. The mechanical lock unit according to claim 1 wherein:
    said teeth-form split gripper assembly has an outer surface that defines at least one ramp; and further comprising
    a lock piston located for sliding parallel to said longitudinal axis, said lock piston having a ramped portion defining an inside surface for selective engagement with said at least one ramp on said outer surface of said teeth-form split gripper assembly for selectively pressing said teeth-form split gripper assembly into contact with said teeth-form ring.

8. The mechanical lock unit according to claim 7, wherein,
    the outer surface of the teeth-form gripper assembly includes a flat run adjacent to the at least one ramp; and
    the inside surface of the lock piston includes a corresponding flat run portion adjacent to the ramped portion.

9. A pipeline isolation tool comprising:
    a shaft having a plug cylinder affixed thereto;
    a packer activated by hydraulic pressure used to move said plug cylinder and said shaft;
    a mechanical lock unit for securing a position of said shaft, said mechanical lock unit comprising a teeth-form ring for surrounding said shaft, said teeth-form ring having a first end, a second end, a longitudinal axis, and an outer surface, said outer surface defining a plurality of teeth thereon;
    a teeth-form split gripper assembly surrounding said teeth-form ring, said teeth-form split gripper assembly having at least a first teeth-form split gripper, a second teeth-form split gripper, and a spring between said first teeth-form split gripper and said second teeth-form split gripper for biasing said first teeth-form split gripper away from said second teeth-form split gripper;
    said first teeth-form split gripper and said second teeth form split gripper defining an inner surface, said inner surface defining a plurality of teeth for cooperative engagement with said plurality of teeth of said teeth-form ring.

10. The mechanical lock unit according to claim 9 wherein:
    said teeth-form ring has a first part and a second part for facilitating installation on said shaft.

11. The mechanical lock unit according to claim 10 further comprising:
    a connector for joining said first part and said second part of said teeth-form ring.

12. The mechanical lock unit according to claim 9 wherein:
    said teeth-form ring defines a slot for receiving a guide pin for slidably retaining said teeth-form ring on a shaft for limiting axial travel of said teeth-form ring on the shaft.

13. The mechanical lock unit according to claim 9 wherein said plurality of teeth on said teeth form ring and said plurality of teeth on said teeth form split gripper assembly are parallel for allowing full rotation of said teeth-form split gripper assembly with respect to said teeth-form ring without losing engagement.

14. The mechanical lock unit according to claim 9 wherein:
    said teeth-form split gripper assembly has an outer surface that defines at least one ramp; and further comprising
    a lock piston located for sliding parallel to said longitudinal axis, said lock piston having a ramped portion defining an inside surface for selective engagement with said at least one ramp on said outer surface of said teeth-form split gripper assembly for selectively pressing said teeth-form split gripper assembly into contact with said a teeth-form ring.

15. The mechanical lock unit according to claim 14, wherein,
the outer surface of the teeth-form gripper assembly includes a flat run adjacent to the at least one ramp; and
the inside surface of the lock piston includes a corresponding flat run portion adjacent to the ramped portion.

16. A method of securing a pipeline isolation tool in a pipeline comprising:
moving a piston for actuating the isolation tool, said piston affixed to a shaft;
extending a slip assembly to engage a wall of the pipeline;
extending a packer to engage the wall of the pipeline for creating a high pressure on a high pressure side of the isolation tool and a low pressure on a low pressure side of the isolation tool;
engaging said shaft with a mechanical lock;
compressing a compression spring with said high pressure by moving said cylinder towards said low pressure side;
wherein said moving of said cylinder increases a set volume, which lowers a set pressure for effecting a self-lock mode.

17. The method according to claim 16 wherein:
said mechanical lock comprises a teeth-form ring for surrounding said shaft, said teeth-form ring having a first end, a second end, a longitudinal axis, and an outer surface, said outer surface defining a plurality of teeth thereon;

a teeth-form split gripper assembly surrounding said teeth-form ring, said teeth-form split gripper assembly having at least a first teeth-form split gripper and a second teeth-form split gripper, said first teeth-form split gripper and said second teeth form split gripper defining an inner surface, said inner surface defining a plurality of teeth for cooperative engagement with said plurality of teeth of said teeth-form ring.

18. Th method according to claim 17, wherein the mechanical lock further comprises:
a spring between said first teeth-form split gripper and said second teeth-form split gripper for biasing said first teeth-form split gripper away from said second teeth-form split gripper.

19. The method according to claim 17, wherein:
said teeth-form split gripper assembly has an outer surface that defines at least one ramp; and
wherein the mechanical lock further comprises:
a lock piston located for sliding parallel to said longitudinal axis, said lock piston having a ramped portion defining an inside surface for selective engagement with said at least one ramp on said outer surface of said teeth-form split gripper assembly for selectively pressing said teeth-form split gripper assembly into contact with said a teeth-form ring.

20. The method according to claim 19, wherein:
the outer surface of the teeth-form gripper assembly includes a flat run adjacent to the at least one ramp; and
the inside surface of the lock piston includes a corresponding flat run portion adjacent to the ramped portion.

* * * * *